J. C. McCOLLUM.
Adjustable Stiff Cruppers for Harness.
No. 199,561.  Patented Jan. 22, 1878.
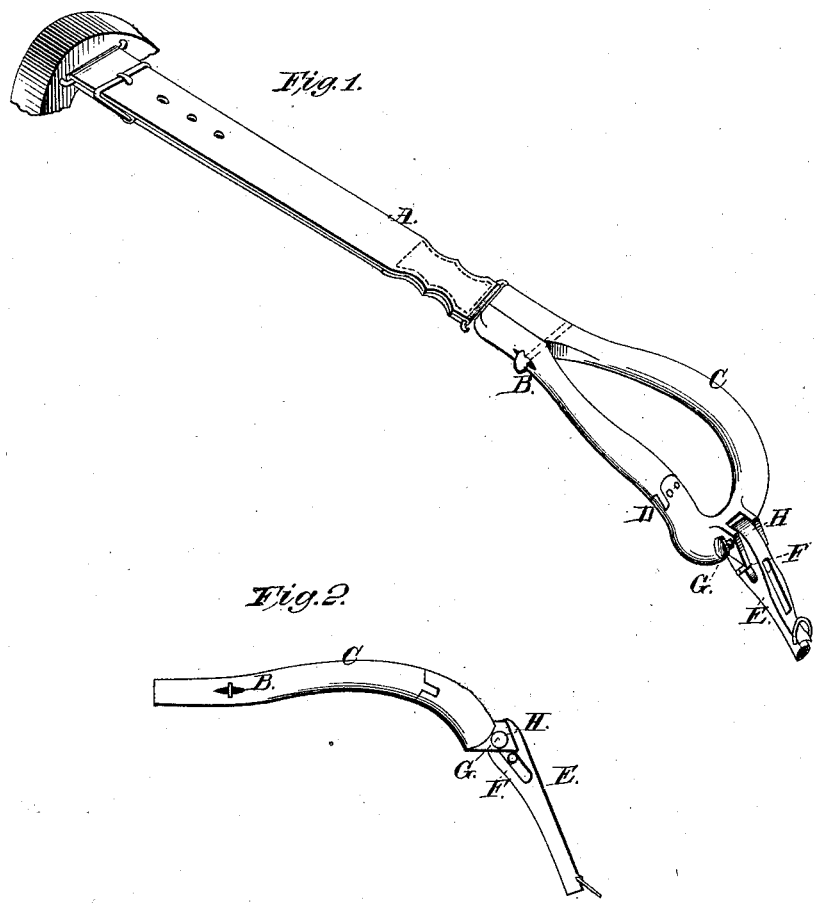

UNITED STATES PATENT OFFICE.

JAMES C. McCOLLUM, OF LOS ANGELES, CALIFORNIA.

IMPROVEMENT IN ADJUSTABLE STIFF CRUPPERS FOR HARNESS.

Specification forming part of Letters Patent No. 199,561, dated January 22, 1878; application filed May 10, 1877.

*To all whom it may concern:*

Be it known that I, JAMES C. McCOLLUM, of the city and county of Los Angeles, State of California, have invented a new and useful Improvement in an Adjustable Stiff Crupper for Harness, which improvement is fully set forth in the following specification and accompanying drawings, in which—

Figure 1 is a view of the invention when set at any required angle for actual use. Fig. 2 is a view of the same when loose and prior to application for service.

The object of my invention is to furnish a device by which a horse can be prevented from clamping his tail over the line, thereby often frightening him, or causing him to kick, run away, or otherwise endanger life, and also injure the animal or destroy the vehicle.

In the drawing, A is the back-strap connecting the crupper with the tree of the harness; B, the fastening; C, the crupper; D, the hinge. E is the movable tail-rest. F is the adjustable slide, by means of which the tail is supported. G is a screw securing the slide at the required angle. H is the point of connection between the rest and slide and the crupper proper.

Once having been put in place as any common crupper and adjusted to the desired angle, the animal can raise the tail at pleasure and move it sufficiently sidewise; but it cannot be lowered so as to clamp the line.

Having thus described my invention, what I claim as new, and desire to secure by Letters Patent, is—

1. The combination, with the rigid adjustable crupper C, of the tail-support E, pivoted thereto and adapted for use, all as shown and described.

2. The combination, with the back-strap of a harness, of the crupper C and pivoted tail-support E, all arranged substantially as shown, for the purpose stated.

JAMES C. McCOLLUM.

Witnesses:
J. W. STUMP,
J. J. MAXWELL.